(12) United States Patent
Lande Blau et al.

(10) Patent No.: US 12,580,821 B1
(45) Date of Patent: Mar. 17, 2026

(54) ENDPOINT DETECTION AND RESPONSE BASED ON AGGREGATED RUNTIME EXECUTION DATA

(71) Applicant: Wiz, Inc., New York, NY (US)

(72) Inventors: Amir Lande Blau, Tel Aviv (IL); Michael Aminov, Givatayim (IL); Arik Nemtsov, New York, NY (US); Udi Reitblat, Tel Aviv (IL); Shahar Yakov, Givatayim (IL); Jonathan Doron, Herzliya (IL); Eliad Peller, Gimzo (IL); Gal De Leon, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/962,541

(22) Filed: Nov. 27, 2024

(51) Int. Cl.
| | |
|---|---|
| *H04L 41/142* | (2022.01) |
| *G08G 1/00* | (2006.01) |
| *H04L 9/40* | (2022.01) |
| *H04L 43/026* | (2022.01) |
| *H04L 43/04* | (2022.01) |

(52) U.S. Cl.
CPC ............. *H04L 41/142* (2013.01); *G08G 1/20* (2013.01); *H04L 43/026* (2013.01); *H04L 43/04* (2013.01); *H04L 63/1441* (2013.01)

(58) Field of Classification Search
CPC ........... B60W 30/095; B60W 30/0953; B60W 30/0956; G01C 21/3407; G01C 21/3804; G05D 1/0055; G05D 1/0088; G05D 1/0214; G05D 1/0221; G05D 1/0291; G05D 1/227; G05D 1/617; H04L 41/142; H04L 43/0888; H04L 63/1416; H04L 63/1441
See application file for complete search history.

(56) References Cited

U.S. PATENT DOCUMENTS

| | | | |
|---|---|---|---|
| 8,566,944 | B2 | 10/2013 | Peinado et al. |
| 9,305,165 | B2 | 4/2016 | Snow et al. |
| 11,106,792 | B2 | 8/2021 | Kostyushko et al. |
| 2007/0266435 | A1 | 11/2007 | Williams et al. |
| 2008/0016339 | A1 | 1/2008 | Shukla |
| 2010/0064367 | A1 | 3/2010 | Lysemose Hansen |
| 2018/0219879 | A1* | 8/2018 | Pierce ................... H04L 41/142 |

FOREIGN PATENT DOCUMENTS

WO      WO-2020222983   A1 *   11/2020         ............... G08G 1/20

* cited by examiner

*Primary Examiner* — Kyung H Shin
(74) *Attorney, Agent, or Firm* — M&B IP Analysts, LLC

(57) ABSTRACT

A system and method for improved endpoint detection and response (EDR) in a cloud computing environment by decreasing network bandwidth usage are presented. The method includes: configuring a resource in a cloud computing environment to deploy thereon a runtime sensor, the runtime sensor configured to detect runtime data of the resource; configuring the runtime sensor to detect in the runtime data a plurality of events, each event sharing a common value; configuring the runtime sensor to generate an aggregated event record based on the detected plurality of events having a common value; receiving the aggregated event record from the runtime sensor; generating a plurality of unmerged event records based on the aggregated event record; and storing the unmerged event records in a cloud computing storage.

19 Claims, 5 Drawing Sheets

START

S410
RECEIVE RUNTIME EVENTS FROM A RUNTIME SENSOR

S420
DETECT AGGREGABLE EVENTS

S430
GENERATE AN AGGREGATED EVENT RECORD BASED ON A DETECTED AGGREGABLE EVENT

S440
TRANSMIT THE AGGREGATED EVENT RECORD TO AN INSPECTION ENVIRONMENT

S450
GENERATE UNMERGED EVENT RECORDS

END

ENDPOINT DETECTION AND RESPONSE BASED ON AGGREGATED RUNTIME EXECUTION DATA

TECHNICAL FIELD

The present disclosure relates generally to the detection of cybersecurity threats in a cloud computing environment, and specifically to endpoint detection and response utilizing aggregated runtime execution data generated from a runtime sensor.

BACKGROUND

Cybersecurity threats come in many shapes and forms, such as malware, worms, crypto miners, man-in-the-middle attacks, code injection, misconfigurations, and so on. Different threats pose different risks and can often be detected in different ways. As such, there are many solutions which detect different types of cybersecurity threats, each with advantages and disadvantages. Cloud computing platforms, such as provided by Amazon® Web Services (AWS), Google® Cloud Platform (GCP), Microsoft® Azure, and the like, are high value targets for attackers, and therefore their vulnerabilities are more likely to become cybersecurity threats. It is therefore extremely useful to detect such cybersecurity threats.

For example, agent based solutions are able to detect both runtime and stored data, allowing to form a complete picture of the cybersecurity status of a machine having the agent installed thereon. However, agent based solutions require heavy use of compute resources, such as processor, and memory resources. This is due to the agent being deployed on the machine which is scanned. For endpoints in a network, this type of solution is impractical, as the use of those resources are reserved for performing the task of the endpoint machine.

Furthermore, some agent solutions also require communication with a backend which provides definitions, rules, and the like, in order to enable the agent to scan for cybersecurity threats using up to date information. Additionally, some agent based solutions require root privileges, or are deployed as a privileged software container. This in itself is a security risk, as conveying such permissions is inherently risky. Therefore, as an endpoint detection and response (EDR) solution for a cloud computing production environment, agent based solutions fail at their objective, and indeed such solutions are rarely used on network endpoints due to the above mentioned reasons.

Agentless solutions, on the other hand, do not require an agent installed on a machine. These solutions include static analysis, for example of a disk of a machine, to determine what cybersecurity threats are present. However, such solutions likewise fail at providing a complete picture, since static analysis solutions do not have access to runtime data. Such agentless solutions also fail to provide real time threat detection, thereby potentially leaving cybersecurity threats with a response for prolonged periods of time.

Utilizing both types of solution is not always practical, as there is overlap in the data of agent and agentless solutions, and the computational costs of deploying both solutions on a single network are great. This leads, in practice, to a choice between either type of solution, with the resignation that some threats will inevitably go undetected.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include configuring a resource in a cloud computing environment to deploy thereon a runtime sensor, the runtime sensor configured to detect runtime data of the resource. A method may also include configuring the runtime sensor to detect in the runtime data a plurality of events, each event sharing a common value. A method may furthermore include configuring the runtime sensor to generate an aggregated event record based on the detected plurality of events having a common value. A method may in addition include receiving the aggregated event record from the runtime sensor. A method may moreover include generating a plurality of unmerged event records based on the aggregated event record. A method may also include storing the unmerged event records in a cloud computing storage. Other embodiments of this aspect include corresponding computer systems, apparatus, and computer programs recorded on one or more computer storage devices, each configured to perform the actions of the methods.

Implementations may include one or more of the following features. A method where generating the plurality of unmerged event records further comprises: parsing the aggregated event record to detect an aggregated data field, the aggregated data field including a plurality of values; and generating an unmerged event record of the plurality of unmerged event records based on: a value of the plurality of values, and another value of another data field of the aggregated event record. A method may include: applying a policy on the stored unmerged event records. A method may include: detecting an identifier of a resource in an unmerged event record; inspecting the resource for a cybersecurity object; detecting an event in another unmerged event record; and initiating a remediation action based on a toxic combination, in response to detecting the cybersecurity object and the event. A method may include: detecting aggregable events based on a common value of a data of runtime data. A method may include: generating the aggregated event record based on a plurality of events, each event corresponding to a type of runtime process. A method may include:

configuring the runtime sensor to periodically send an aggregated event record generated within a first time period. A method may include: generating an analysis report based on applying a predefined query on a database storing thereon the unmerged event records. A method may include: initiating a mitigation action in response to detecting a first event in the unmerged event records from a first resource and a second event in the unmerged event records from a second resource. Implementations of the described techniques may include hardware, a method or process, or a computer tangible medium.

In one general aspect, a non-transitory computer-readable medium may include one or more instructions that, when executed by one or more processors of a device, cause the device to: configure a resource in a cloud computing environment to deploy thereon a runtime sensor, the runtime sensor configured to detect runtime data of the resource; configure the runtime sensor to detect in the runtime data a plurality of events, each event sharing a common value; configure the runtime sensor to generate an aggregated event record based on the detected plurality of events having a common value; receive the aggregated event record from the runtime sensor; generate a plurality of unmerged event records based on the aggregated event record; and store the unmerged event records in a cloud computing storage. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: configure a resource in a cloud computing environment to deploy thereon a runtime sensor, the runtime sensor configured to detect runtime data of the resource. A system may in addition configure the runtime sensor to detect in the runtime data a plurality of events, each event sharing a common value. A system may moreover configure the runtime sensor to generate an aggregated event record based on the detected plurality of events having a common value. A system may also include receive the aggregated event record from the runtime sensor. A system may furthermore generate a plurality of unmerged event records based on the aggregated event record. A system may in addition store the unmerged event records in a cloud computing storage. Other embodiments of this aspect include corresponding computer systems, apparatus, and computer programs recorded on one or more computer storage devices, each configured to perform the actions of the methods.

Implementations may include one or more of the following features. A system where the memory contains further instructions that, when executed by the processing circuitry for generating the plurality of unmerged event records, further configure the system to: parse the aggregated event record to detect an aggregated data field, the aggregated data field including a plurality of values; and generate an unmerged event record of the plurality of unmerged event records based on: a value of the plurality of values, and another value of another data field of the aggregated event record. A system where the memory contains further instructions which when executed by the processing circuitry further configure the system to: apply a policy on the stored unmerged event records. A system where the memory contains further instructions which when executed by the processing circuitry further configure the system to: detect an identifier of a resource in an unmerged event record; inspect the resource for a cybersecurity object; detect an event in another unmerged event record; and initiate a remediation action based on a toxic combination, in response to detecting the cybersecurity object and the event. A system where the memory contains further instructions which when executed by the processing circuitry further configure the system to: detect aggregable events based on a common value of a data of runtime data. A system where the memory contains further instructions which when executed by the processing circuitry further configure the system to: generate the aggregated event record based on a plurality of events, each event corresponding to a type of runtime process. A system where the memory contains further instructions which when executed by the processing circuitry further configure the system to: configure the runtime sensor to periodically send an aggregated event record generated within a first time period. A system where the memory contains further instructions which when executed by the processing circuitry further configure the system to: generate an analysis report based on applying a predefined query on a database storing thereon the unmerged event records. A system where the memory contains further instructions which when executed by the processing circuitry further configure the system to: initiate a mitigation action in response to detecting a first event in the unmerged event records from a first resource and a second event in the unmerged event records from a second resource. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
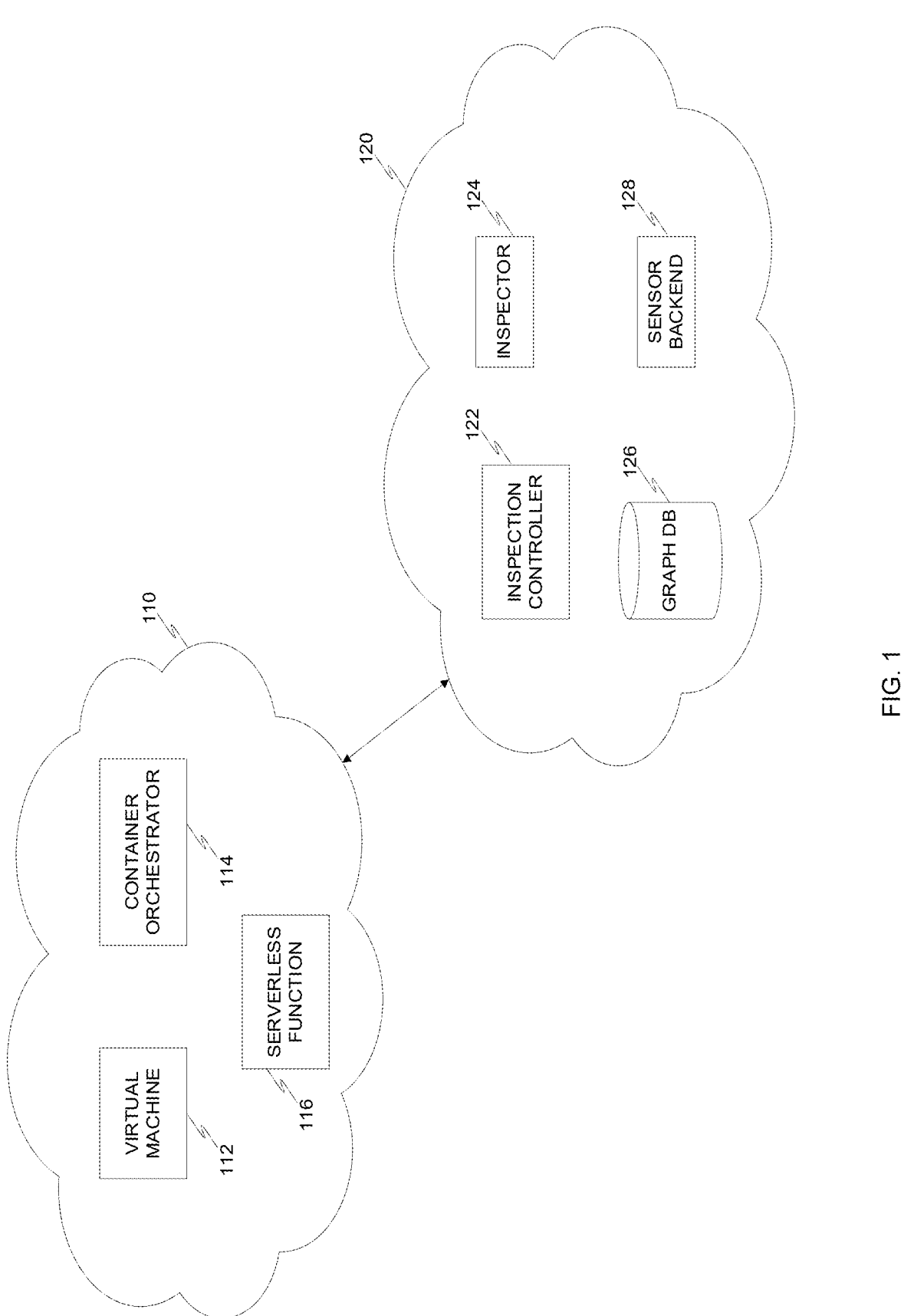
FIG. 1 is a schematic diagram of a cloud computing environment monitored for a cybersecurity threat by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for endpoint detection and response based on utilizing aggregated runtime execution data from a runtime sensor. A sensor is a software package executable on a machine, such as an endpoint machine. An endpoint machine (or simply "endpoint") may be, for example, a proxy, a gateway, a reverse proxy, a webserver, and the like. A sensor is able to deploy on an endpoint utilizing less resources than an agent, according to an embodiment, as the sensor is passive in collecting data, while a software agent is configured to interact with a system and perform certain actions thereon. Complementing sensor capabilities by a static analysis solution, such as a cybersecurity threat inspector, therefore provides for a full view (e.g., state) of a machine in a computing environment.

In an embodiment, the sensor is configured to listen to a data link layer. For example, in an embodiment, a sensor is configured to listen for packets utilizing the extended Berkeley Packet Filter (eBPF) interface. In certain embodiments, the sensor is configured to request rules, definitions, and the like, from a sensor backend server. The sensor is configured, for example, to apply a rule from the requested rules, definitions, and the like to an event detected by listening on the eBPF interface of a machine on which the sensor is deployed. In certain embodiments, the sensor is configured to send an event to the sensor backend server, for example in response to determining that the event matches a predefined definition.

In certain embodiments the sensor is configured to send an event, for example based on a predetermined definition, to a sensor backend server, which is configured to store the event on a security graph. The security graph includes a representation of the cloud computing environment in which the endpoint is deployed. For example, the sensor may detect that the endpoint sent a network packet to an IP address which is associated with a known cybersecurity risk, such as a coin mining pool. The sensor is configured to generate a notification to a sensor backend server. In an embodiment, the sensor backend server is configured to generate an instruction for an inspection controller. The inspection controller, in turn, is configured to provision an inspector to inspect the endpoint for the presence of a crypto miner malware.

By performing runtime and static analysis in this manner, the overlap in detection between the sensor and inspector is reduced. Additionally, utilizing the sensor allows initiating inspection by the inspector, which allows efficient prioritizing of inspection resources, thereby reducing time to detection of cybersecurity threats, which also reduces time to respond to cybersecurity threats.

FIG. 1 is an example schematic diagram of a cloud computing environment monitored for a cybersecurity threat by an inspection environment, implemented in accordance with an embodiment. In an embodiment, a cloud computing environment 110 is implemented as a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like. A cloud computing environment 110 includes cloud entities deployed therein.

A cloud entity may be, for example, a principal, a resource, a combination thereof, and the like. In an embodiment, a resource is a cloud entity which provides access to a compute resource, such as a processor, a memory, a storage, and the like. In some embodiments a resource is a virtual machine, a software container, a serverless function, and the like. A resource may be, or may include, a software application deployed thereon, such as a webserver, a gateway, a load balancer, a web application firewall (WAF), an appliance, and the like.

In certain embodiments, a principal is a cloud entity which is authorized to initiate actions in the cloud computing environment. A cloud entity may be, for example, a user account, a service account, a role, and the like. In some embodiments, a cloud entity is a principal relative to another cloud entity, and a resource to other cloud entities. For example, a load balancer is a resource to a user account requesting a webpage from a webserver behind the load balancer, and the load balancer is a principal to the webserver.

The cloud computing environment 110 includes a plurality of resources, such as virtual machine 112, software container orchestrator 114, and serverless function 116. A virtual machine 112 may be deployed, for example, utilizing Oracle® VirtualBox®. A software container orchestrator 114 may be deployed, for example, utilizing a Docker® engine, a Kubernetes® engine, and the like. In an embodiment, a software container orchestrator 114 is configured to deploy a software cluster, each cluster including a plurality of nodes. In an embodiment, a node includes a plurality of pods. A serverless function 116, may be, for example, utilized with Amazon® Lambda. In an embodiment, the serverless function 116 is a serverless function container image.

Each such resource is susceptible to various cybersecurity threats. Such threats can become apparent for example due to a software version of an application in a software container 114, an operating system (OS) version of a virtual machine 112, a misconfiguration in code of a serverless function 116, and the like. The cloud computing environment 110 is monitored for cybersecurity threats by an inspection environment 120. In an embodiment, the inspection environment is implemented as a cloud computing environment, such as a VPC, VNet, and the like.

In an embodiment, each of the virtual machine 112, the software container 114, and the serverless function 116 include a sensor configured to a particular resource, resource type, combination thereof, and the like. An example deployment of a sensor is discussed in more detail in FIG. 2 below.

In an embodiment, the sensor (not shown in FIG. 1) is configured to listen for events, packets, and the like, on a data link layer. For example, the sensor is configured to utilize an eBPF interface, which allows non-intrusive monitoring of the data link layer communication.

In some embodiments, the sensor is implemented as a runtime sensor which is configured to be deployed in operating systems and open source platform clusters. In certain embodiments, the runtime sensor is configured to monitor system behavior in real time in order to detect cybersecurity threats. In an embodiment, the runtime sensor is configured to track and log events in real time. In various embodiments, events include Domain Name System (DNS) queries, incoming connections, outgoing connections, executed processes, a combination thereof, and the like.

In certain embodiments, the sensor is further configured to send data to and receive data from a sensor backend server 128. The sensor backend server 128 is a workload, such as a virtual machine, software container, serverless function, combination thereof, and the like, which is deployed in the inspection environment 120.

In an embodiment, the sensor backend server 128 is configured to receive sensor generated data. For example, the sensor backend server 128 is configured, in an embodiment, to receive events from a sensor. In some embodiments, the sensor is configured to request from the sensor backend server 128 rules, definitions, and the like, which the sensor is configured to apply to events, for example as detected on an eBPF interface. For example, a predetermined event, such as indicating access to an IP address, IP address range, and the like, may be checked against a definition. A definition is a logical expression which, when applied to an event, yields a "true" or "false" result. In an embodiment, a rule is a logical expression which includes an action. For example, a rule may be that if a certain definition is true when applied to an event, data pertaining to the event should be sent to the sensor backend server 128.

In some embodiments, the sensor backend server 128 is configured to initiate inspection of a resource deployed in the cloud computing environment 110. For example, the sensor backend server 128 may be configured to initiate such inspection in response to receiving an event, data, a combination thereof, and the like, from a sensor deployed on a resource. In an embodiment, initiating inspection of a resource is performed by generating an instruction for an inspection controller 122, the instruction, when executed, configures an inspector 124 to inspect the resource.

For example, a sensor is configured to send event data to the sensor backend server 128 in response to detecting that a definition, applied by the sensor to a detected event, results in a "true" value when applied. As an example, the definition may be "is the IP address in the range of 127.0.0.1 through 127.0.0.99", which in this example corresponds to an IP address range used by a malware, such as a crypto miner. When the definition is applied, for example to a detected network packet, and the result is "true", the sensor is configured to send data pertaining to the event to the sensor backend server 128. Data pertaining to the event may be, for example, an IP address, an event type, combinations thereof, and the like.

In an embodiment, the sensor backend server 128 is configured to receive the data. In some embodiments, the sensor backend server 128 is further configured to apply a rule to the received data to determine if an inspection of the workload on which the sensor is deployed should be inspected for a cybersecurity threat. For example, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

For example, the sensor backend server 128 may generate an instruction for the inspection controller 122, which when executed by the inspection controller generates an inspectable disk, for example utilizing a snapshot, a copy, a clone, and the like of a disk (not shown) associated with the virtual machine 112 and provides access to an inspector 124 to the inspectable disk. In an embodiment, the inspector 124 is configured to detect a cybersecurity threat. For example, the inspector 124 is configured to receive, in an embodiment, a hash of an application stored on the inspectable disk and determine if the hash matches a hash of known malware applications. In certain embodiments, the inspector 124 is provided with a persistent volume claim (PVC) to the inspectable disk.

In some embodiments, the sensor is configured to generate a hash of an application on the resource, such as the virtual machine 112, on which it is deployed, and send the hash to the sensor backend server 128. The received hash may then be compared, for example by providing it to the inspector 124, with known hash values which correspond to malware applications.

While the examples above discuss malware and crypto miners, it is readily apparent that the sensor and inspector 124 may be utilized to detect other types of cybersecurity threats, such as an exposure, a vulnerability, a weak password, an exposed password, a misconfiguration, and the like.

In certain embodiments, the inspection environment 120 further includes a graph database 126, on which a security is stored. In an embodiment, the security graph is configured to store a representation of a cloud computing environment, such as cloud computing environment 110. For example, the representation may be based on a predefined unified data schema, so that each different cloud platform may be represented using a unified data schema, allowing for a unified representation. For example, a principal may be represented by a predefined data structure, each principal represented by a node in the security graph. Likewise, a resource may be represented by another predefined data structure, each resource represented by a node in the security graph.

In certain embodiments, data received from a sensor deployed on a resource in the cloud computing environment may be stored in the graph database as part of the security graph. In the example above, in response to receiving data from the sensor which indicates a potential malware infection of the virtual machine 112, the sensor backend server 128 is configured, in an embodiment, to generate a node representing the malware in the security graph, generate a node in the security graph representing the virtual machine 112, and connect the node representing the malware with the node representing the virtual machine 112.

Figure 2:
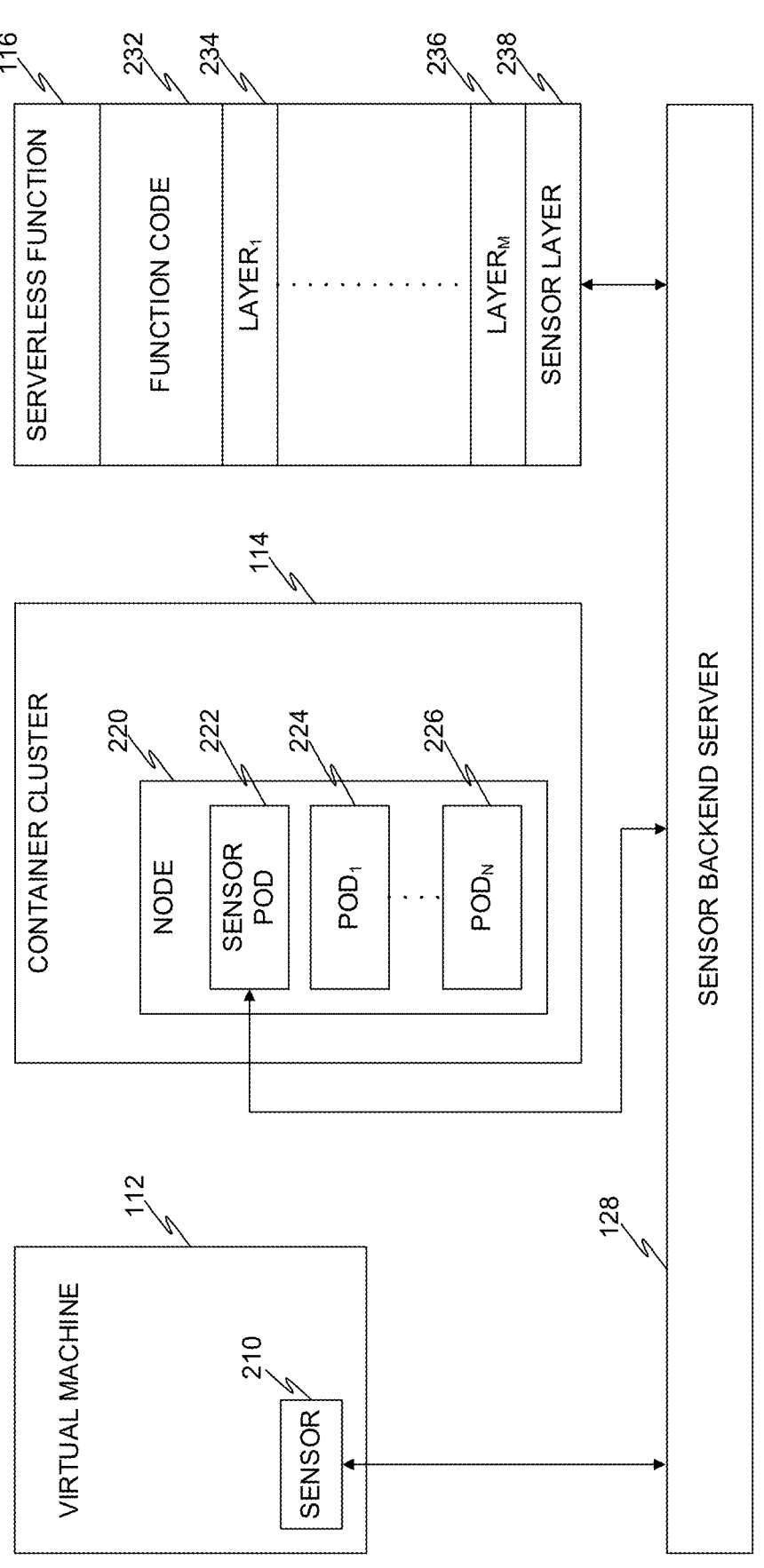
FIG. 2 is a schematic illustration of a sensor backend server communicating with a plurality of sensors deployed on various workloads, implemented in accordance with an embodiment.

FIG. 2 is an example schematic illustration of a sensor backend server communicating with a plurality of sensors deployed on various workloads, implemented in accordance with an embodiment. In some embodiments, a sensor backend server 128 is configured to communicate with a machine (not shown) having a sensor installed thereon and communicatively coupled with the sensor backend server 128. In an embodiment, the machine is bare metal machine, a computer device, a networked computer device, a laptop, a tablet, and the like computing devices.

In an embodiment, a sensor backend server 128 is implemented as a virtual machine, a software container, a serverless function, a combination thereof, and the like. In certain embodiments, a plurality of sensor backend servers 128 may be implemented. In some embodiments, where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc.

In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 112 includes a sensor 210. In an embodiment, the sensor 210 is deployed as a service executed on the virtual machine 112. In some embodiments, a virtual machine 112 is configured to request binary code, a software package, and the like, for example from a sensor backend server 128, which when executed by the virtual machine 112 cause a sensor 210 to run as a service on the virtual machine 112. The sensor 210 is configured to listen to a data link layer communication, for example through an eBPF interface.

A container cluster 114 runs a daemonset, and includes a plurality of nodes, such as node 220. The daemonset ensures that each node 220 runs a daemonset pod 222, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 224 through pod-N 226, where 'N' is an integer having a value of '1' or greater. The daemonset pod 222 is configured, in an embodiment, to communicate with the sensor backend server 128.

A serverless function 116 includes, in an embodiment, a function code 232, and a plurality of code layers 1 through M (labeled respectively as 234 through 236), where 'M' is an integer having a value of '1' or greater. For example, in AWS Lambda a layer contains, in an embodiment, code, content, a combination thereof, and the like. In some embodiments, a layer, such as layer 234 includes runtime data, configuration data, software libraries, and the like.

In certain embodiments, the serverless function 116 includes a sensor layer 238. The sensor layer 238 is configured, in an embodiment, to listen to a data link layer communication of the serverless function 116, for example through an eBPF interface.

The sensor service 210, daemonset pod 222, and sensor layer 238 are each an implementation of a sensor, according to an embodiment. In an embodiment, a sensor is configured to communicate with a sensor backend server 128 through a transport layer protocol, such as TCP. For example, the sensor backend server 128 is configured, in an embodiment, to listen to a predetermined port using a TCP protocol, and a sensor, such as sensor 210, daemonset pod 222, and sensor layer 238 are each configured to communicate with the sensor backend server 128, for example by initiating communication using TCP over the predetermined port.

Figure 3:
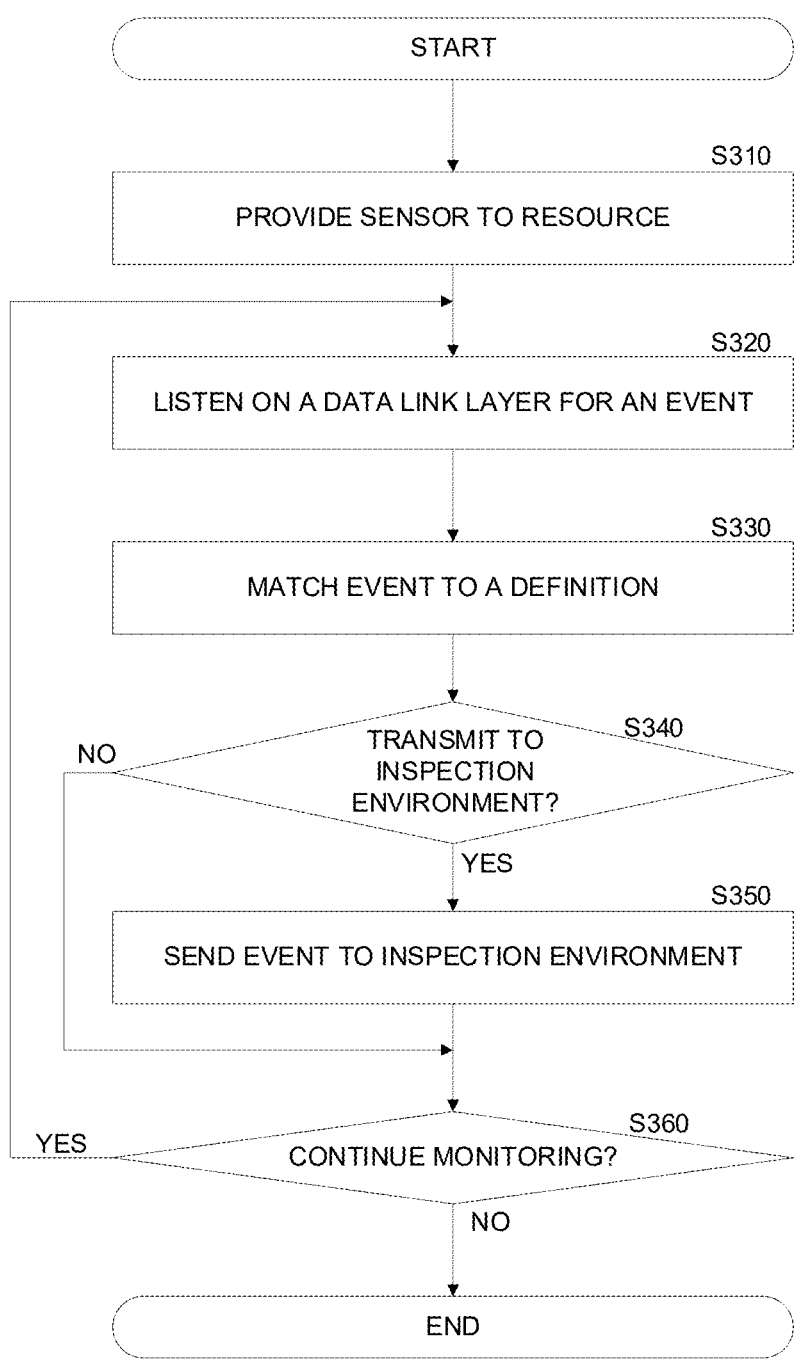
FIG. 3 is a flowchart of a method for performing cybersecurity threat detection on a resource in a cloud computing environment, implemented in accordance with an embodiment.

FIG. 3 is an example flowchart of a method for performing cybersecurity threat detection on a resource in a cloud computing environment, implemented in accordance with an embodiment.

At S310, a resource is provided with a sensor software. In an embodiment, the resource is any one of a virtual machine, a software container, a serverless function, and the like. In certain embodiments, the sensor software is provided based on the resource type. For example, a virtual machine is provided with a software package, such as an executable code, for example a binary code.

A software container engine is provided with a daemonset, so that, in an embodiment where a node is deployed in a cluster of the software container engine, the node includes a daemonset pod which is configured to provide the functionality of a sensor, for example such as detailed above. In an embodiment, a serverless function is provided with a sensor layer by providing a code for example in a .ZIP file.

In an embodiment, providing a sensor includes configuring a resource, such as a virtual machine, software container, serverless function, and the like, to receive software which, when executed, configures the resource to deploy a sensor thereon.

At S320, an event is detected from a data link layer communication. In an embodiment, the data link layer is monitored through an eBPF interface for events. In certain embodiments, a software bill of materials (SBOM) is generated. An SBOM may be implemented as a text file, which is based on events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
    exe_name: "/usr/sbin/rpc.mountd"
    last_seen: 1663138800
exe_size: 133664
exe_sha1: "200f06c12975399a4d7a32e171caabfb994f78b9"
modules {
    path: "/usr/lib/libresolv-2.32.so"
    last_seen: 1663138800
}
modules {
    path: "/usr/lib/libpthread-2.32.so"
    last_seen: 1663138800
}
modules {
    path: "/usr/lib/ld-2.32.so"
    last_seen: 1663138800
}
modules {
    path: "/usr/lib/libc-2.32.so"
    last_seen: 1663138800
}
modules {
    path: "/usr/lib/libtirpc.so.3.0.0"
    last_seen: 1663138800
}
modules {
    path: "/usr/lib/libnss_files-2.32.so"
    last_seen: 1663138800
}
modules {
    path: "/usr/sbin/rpc.mountd"
    last_seen: 1663138800
}
listening_sockets {
    ip_addr: "0.0.0.0"
    port: 60311
}
listening_sockets {
    ip_addr: "0.0.0.0"
    port: 43639
}
```

This portion of an SBOM indicates that a remote procedure call (RPC) is executed, which is configured to receive a client request to mount a file system.

At S330, the event is matched to a definition. In some embodiments, a definition includes a logical expression, which when applied to an event, results in a "true" or "false" value. For example, a definition may state "software library xyz is accessed", with a result being either true or false, when applied to an event. In some embodiments, a rule is applied to an event. In an embodiment, a rule is a logical expression which further includes an action. For example, a rule states, in an embodiment, "IF software library xyz is accessed by UNKNOWN SOFTWARE, generate an alert". In this example, where an event is detected in which a software having an unknown identifier, for example which does not match a list of preapproved identifiers, attempts to access software library xyz, an alert is generated to indicate that such access is performed.

At S340, a check is performed to determine if data should be transmitted to an inspection environment. In some embodiments, the check is performed by applying a rule to an event, and determining transmission based on an output of applying the rule. If 'yes', execution continues at S350, if 'no' execution continues at S360.

At S350, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S360, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like. In some embodiments, the check is performed based on a predetermined amount of elapsed time (e.g., every four hours, every day, twice a day, etc.). If 'yes', execution continues at S320. If 'no', in an embodiment execution terminates. In some embodiments, if 'no', another check is performed at S360, for example after a predetermined period of time has lapsed.

Figure 4:
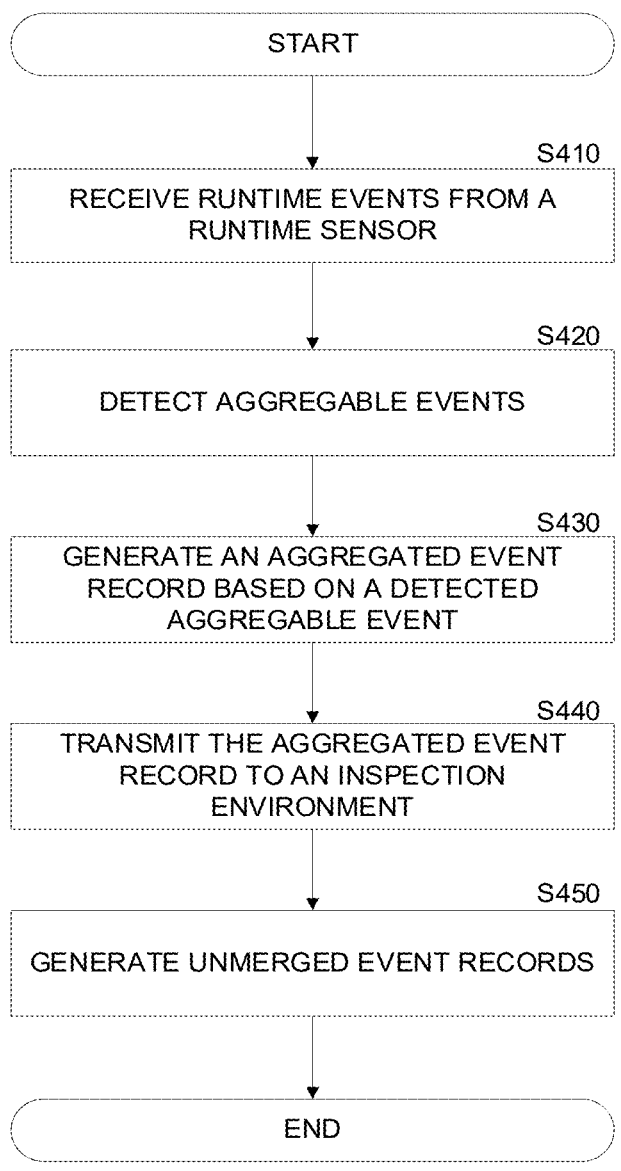
FIG. 4 is a flowchart of a method for generating an aggregated event record based on events from a runtime sensor, implemented in accordance with an embodiment.

FIG. 4 is an example flowchart of a method for generating an aggregated event record based on events from a runtime sensor, implemented in accordance with an embodiment.

Detecting threats and vulnerabilities in cloud workloads are challenging as agent-based solutions lack cloud context, require constant maintenance, and have limited visibility in finding vulnerabilities. Endpoint detection and response faces several challenges in identifying genuine threats due to the sheer volume of data generated by endpoints. Therefore, it is advantageous to utilize a runtime sensor, for endpoint detection and response, as it provides broader visibility, provides real-time protection, and enables effective threat detection, for a workload.

Further, the aggregation of event records is advantageous as it decreases the amount of data that needs to be transmitted over a network between the resource on which a sensor is deployed and a backend server. Thus, improving system performance and reducing costs.

At S410, runtime events are received from a runtime sensor. In an embodiment, runtime events are detected by a runtime sensor. In some embodiments, the runtime sensor is configured to be deployed on virtual machines, software containers, serverless functions, a combination thereof, and the like. In certain embodiments, the runtime sensor is configured to monitor network traffic in real time.

In an embodiment, the runtime sensor is configured to detect events originating from processes running on a resource, host, software container, physical machine, hardware device, and the like. In certain embodiments, the runtime sensor is configured to perform real-time tracing of system calls, monitor resource usage (e.g., processor, memory, storage, network bandwidth, etc.), a combination thereof, and the like.

In various embodiments, the runtime sensor is configured to detect runtime data. In some embodiments, runtime data includes data being sent, received, etc., by processes of a resource, within a virtual machine, software container, serverless function, a combination thereof, and the like. In an embodiment, runtime data includes events of an event-driven system.

In an embodiment, an event is a data record indicating a change in the state of a system, network, environment, operating system, a combination thereof, and the like. In an embodiment, the runtime sensor is configured to parse and normalize the runtime data, events, event data, and a combination thereof, to generate a standardized data record. In an embodiment, data records store information respective of an event. In various embodiments, a data record includes data fields such as an event type, a program identifier, a date, a command line command, a source Internet Protocol (IP) address, a destination Internet Protocol (IP) address, a port number, a combination thereof, and the like.

In some embodiments, a sensor backend server is configured to receive events, runtime data, data records, a combination thereof, and the like, from the runtime sensor.

At S420, aggregable events are detected. In an embodiment, aggregable events are detected based on a common value of a data of runtime data. In an embodiment, runtime data includes data that is aggregated across multiple processes. According to an embodiment, an aggregable event is an event that shares at least a common value with another event. In an embodiment, common values are identical values, values representing the same amount, values of the same numerical value, common identifiers, a combination thereof, and the like.

In various embodiments, the runtime sensor is configured to correlate events, event data, data records, a combination thereof, and the like, to detect aggregable events. In an embodiment, the runtime sensor is configured to correlate events based on a predefined rule. For example, in an embodiment, the runtime sensor is configured to correlate events of data records if they share common values of a data field. In an embodiment, aggregable events are detected from correlated events that share common values of a specific data field.

For example, in an embodiment, aggregable events are detected if a first data record includes a correlated event of a "process executed" for the program "/home/kubernetes24/" and a second data record includes a second correlated event of "process executed" for an identical program "/home/kubernetes24/". In an embodiment, for example, aggregable events are detected if two correlated events (e.g. incoming connection") are identical and share a common value of occurring on the same date of ""Jul. 27, 2024."

At S430, an aggregated event record is generated. In an embodiment, an aggregated event record is generated based on consolidating aggregable events. In an embodiment, an aggregated event record is generated based on consolidating common values of a specific data field of aggregable events. In an embodiment, common values of a specific data field include identical values, values representing the same amount, values of the same numerical value, common identifiers, a combination thereof, and the like.

For example, in an embodiment, if two aggregable events have a common value of "ip6tables/resource" for the same data field (e.g. command line), the runtime sensor is configured to generate an aggregated event record with a single merged aggregated value of "ip6ables/resource" representing both events.

In various embodiments, the runtime sensor is configured to generate an aggregated event record based on aggregating uncommon values of aggregable events. For example, in an embodiment, if two aggregable events (e.g. incoming connection) occur on the same date (e.g. Aug. 24, 2024), but have different source ports (e.g. 22, 10250, etc.), the runtime sensor is configured to generate a single aggregated event record, including the uncommon values (source port values) under a single data field. In an embodiment, the uncommon values are aggregated into an array format under a single data field in the aggregated event record.

In certain embodiments, an aggregated record includes data fields such as an event identifier, a resource type, a program name, a timestamp of when the event occurred, a command line, a destination address, a source IP address, a destination IP address, a port number, a user identification, a combination thereof, and the like.

At S440, the aggregated event record is transmitted to an inspection environment. According to an embodiment, aggregating a plurality of events into an aggregated event record is advantageous as it reduces the amount of redundant data which is transmitted over a network. For example, in an embodiment, instead of logging two duplicate events of failed login attempts from the same user into two individual data records, aggregating both of the events into an aggregated record is advantageous.

In certain embodiments, the aggregated event record data is serialized into transmittable format such as that of a standardized file such as a JSON, YAML, XML file, and the like. In various embodiments, serializing the event record data is advantageous as it utilizes less storage and can easily be shared across different programming languages and platforms of the environment. In an embodiment, the serialized aggregated event record data is transmitted to the inspection environment by utilizing a file transfer system and uploading the file to the inspection environment, cloud computing storage, and the like.

In some embodiments, the aggregated event record is stored in a cloud computing storage of the inspection environment. In an embodiment, the cloud computing storage is a bucket, a simple storage service (S3), and the like.

At S450, unmerged event records are generated. In various embodiments, the backend server is configured to generate an unmerged event record from parsing the aggregated event record to detect aggregated data fields. In an embodiment, parsing involves utilizing parsing libraries to extract the data fields of the aggregated event record. In various embodiments, the backend server is configured to use parsing tools such as Logstash®, Python® scripts, a combination thereof, and the like, for parsing the event records.

In some embodiments, the uncommon values of the detected aggregated data fields are extracted and separated. Each separated uncommon value is associated with its own event and is used to generate an unmerged event record, in an embodiment.

For example, in an embodiment, the backend server is configured to detect an aggregated data field (e.g. source port) including an array of uncommon values (e.g. 22, 10250, etc.), and extract each uncommon value and associate it with its own event (e.g. incoming connection) to generate an unmerged event record.

In some embodiments, an unmerged event record includes a single value (e.g. identifier, numerical value, etc.) for each data field. In an embodiment, an unmerged event record includes an event identifier, a timestamp of when the event occurred, a resource type, a program name, a command line, a destination Internet IP address, a source IP address, a user identification, a command line, a source port value, a DNS query, a combination thereof, and the like. In some embodiments, the unmerged event record is stored in a cloud computing storage of the inspection environment. In various embodiments, an analysis report is generated based on applying a predefined query to the cloud computing storage.

In an embodiment, a policy is applied on the unmerged event record. In an embodiment a policy includes a rule, a conditional rule, a condition, and the like, that is implemented for the protection against cybersecurity threats, vulnerabilities, exposures, a combination thereof, and the like.

An example of a policy, in an embodiment, is to initiate a mitigation action in response to the detection of an event in an unmerged event record. In an embodiment an event includes an attempt to access a file, failed login attempts, a misconfiguration, a security alert, a malware detection, a combination thereof, and the like.

An example of a policy, in an embodiment, is in response to detecting an identifier of a resource in the unmerged event record, the resource must be inspected for a cybersecurity object. In certain embodiments, a cybersecurity object indicates a cybersecurity threat. According to an embodiment, a cybersecurity object is a hash value, a code object, a password, an application, a software library, a software binary, a combination thereof, and the like.

In some embodiments, a remediation action is initiated in response to the detection of a cybersecurity object associated with the unmerged event record. In various embodiments, a remediation action includes implementing a security patch, providing an update, modifying permissions, implementing access controls, blocking malicious IP addresses, disabling compromised accounts, a combination thereof, and the like.

In some embodiments, a policy includes initiating a mitigation action in response to detecting, for example in a security graph, a cybersecurity object on the resource, and further detecting an event in an unmerged event record, which together form a toxic combination. A toxic combination occurs when two indicators indicate together a cybersecurity issue, threat, vulnerability, exposure, and the like.

In an embodiment, an example of a policy includes initiating a mitigation action in response to detecting a first event in an unmerged event record of a first resource, and a second event in an unmerged event record of a second resource, as these two events indicate a cyberattack, and the like.

Figure 5:
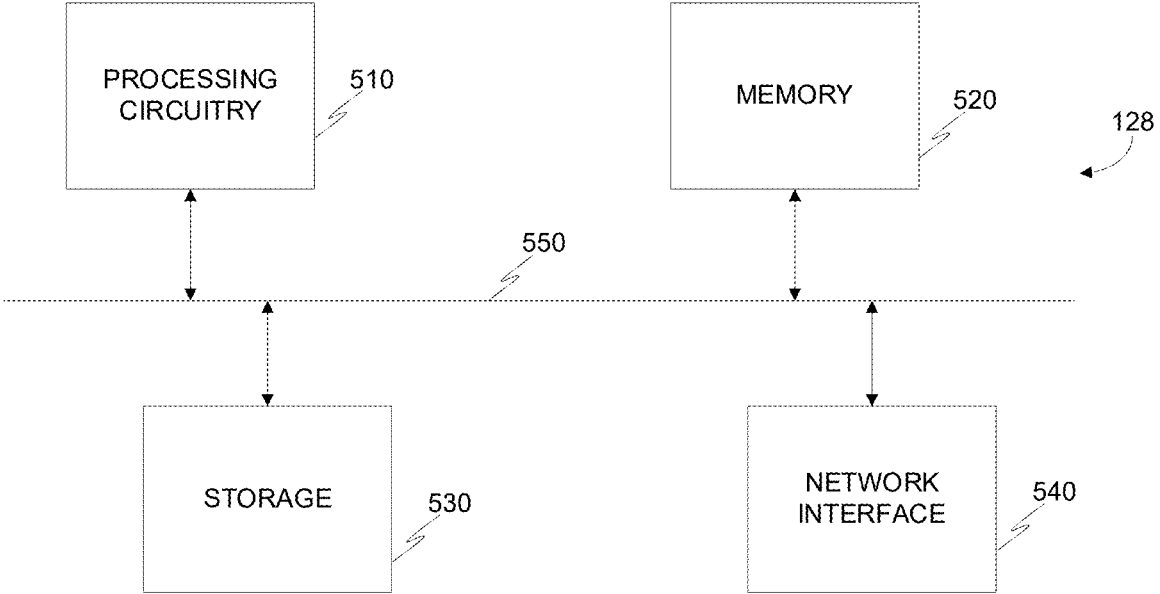
FIG. 5 is a schematic diagram of a backend sensor in accordance with an embodiment.

FIG. 5 is an example schematic diagram of a sensor backend server 128 according to an embodiment. The sensor backend server 128 includes a processing circuitry 510 coupled to a memory 520, a storage 530, and a network interface 540. In an embodiment, the components of the sensor backend server 128 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the sensor backend server 128 to communicate with, for example, a sensor 210, a daemonset pod 222, a sensor layer 238, and the like.

It should be understood that the embodiments described herein are not limited to the specific architecture illustrated in FIG. 5, and other architectures may be equally used without departing from the scope of the disclosed embodiments.

Furthermore, in certain embodiments the inspection controller 122, inspector 124, and the like, may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for improved endpoint detection and response (EDR) in a cloud computing environment by decreasing network bandwidth usage, comprising:

configuring a resource in a cloud computing environment to deploy thereon a runtime sensor, the runtime sensor configured to detect runtime data of the resource;

configuring the runtime sensor to detect in the runtime data a plurality of events, each event associated with a software process executed on the resource of the cloud computing environment, wherein each event sharing a common value of the runtime data that is aggregated across multiple software processes;

configuring the runtime sensor to generate an aggregated event record based on the detected plurality of events having a common value;

receiving the aggregated event record from the runtime sensor;

generating a plurality of unmerged event records based on extracting different uncommon values from an aggregated data field of the aggregated event record; and storing the unmerged event records in a cloud computing storage.

2. The method of claim 1, wherein generating the plurality of unmerged event records further comprises:

parsing the aggregated event record to detect an aggregated data field, the aggregated data field including a plurality of values; and generating an unmerged event record of the plurality of unmerged event records based on: a value of the plurality of values, and another value of another data field of the aggregated event record.

3. The method of claim 1, further comprising:

applying a policy on the stored unmerged event records.

4. The method of claim 1, further comprising:

detecting an identifier of a resource in an unmerged event record;

inspecting the resource for a cybersecurity object;

detecting an event in another unmerged event record; and initiating a remediation action based on a toxic combination, in response to detecting the cybersecurity object and the event.

5. The method of claim 1, further comprising:

detecting aggregable events based on a common value of a data of runtime data.

6. The method of claim 1, further comprising:

generating the aggregated event record based on a plurality of events, each event corresponding to a type of runtime process.

7. The method of claim 1, further comprising:

configuring the runtime sensor to periodically send an aggregated event record generated within a first time period.

8. The method of claim 1, further comprising:

generating an analysis report based on applying a predefined query on a database storing thereon the unmerged event records.

9. The method of claim 1, further comprising:

initiating a mitigation action in response to detecting a first event in the unmerged event records from a first resource and a second event in the unmerged event records from a second resource.

10. A non-transitory computer-readable medium storing a set of instructions for improved endpoint detection and response (EDR) in a cloud computing environment by decreasing network bandwidth usage, the set of instructions comprising:

one or more instructions that, when executed by one or more processors of a device, cause the device to:

configure a resource in a cloud computing environment to deploy thereon a runtime sensor, the runtime sensor configured to detect runtime data of the resource;

configure the runtime sensor to detect in the runtime data a plurality of events, each event associated with a software process executed on the resource of the cloud computing environment, wherein each event sharing a common value of the runtime data that is aggregated across multiple software processes;

configure the runtime sensor to generate an aggregated event record based on the detected plurality of events having a common value;

receive the aggregated event record from the runtime sensor;

generate a plurality of unmerged event records based on an extraction of different uncommon values from an aggregated data field of the aggregated event record; and store the unmerged event records in a cloud computing storage.

11. A system for improved endpoint detection and response (EDR) in a cloud computing environment by decreasing network bandwidth usage comprising:

a processing circuitry;

a memory, the memory containing instructions that, when executed by the processing circuitry, configure the system to:

configure a resource in a cloud computing environment to deploy thereon a runtime sensor, the runtime sensor configured to detect runtime data of the resource;

configure the runtime sensor to detect in the runtime data a plurality of events, each event associated with a software process executed on the resource of the cloud computing environment, wherein each event sharing a common value of runtime data that is aggregated across multiple software processes;

configure the runtime sensor to generate an aggregated event record based on the detected plurality of events having a common value;

receive the aggregated event record from the runtime sensor;

generate a plurality of unmerged event records based on an extraction of different uncommon values from an aggregated data field of the aggregated event record; and store the unmerged event records in a cloud computing storage.

12. The system of claim 11, wherein the memory contains further instructions that, when executed by the processing circuitry for generating the plurality of unmerged event records, further configure the system to:

parse the aggregated event record to detect an aggregated data field, the aggregated data field including a plurality of values; and generate an unmerged event record of the plurality of unmerged event records based on:

a value of the plurality of values, and another value of another data field of the aggregated event record.

13. The system of claim 11, wherein the memory contains further instructions which when executed by the processing circuitry further configure the system to:

apply a policy on the stored unmerged event records.

14. The system of claim 11, wherein the memory contains further instructions which when executed by the processing circuitry further configure the system to:

detect an identifier of a resource in an unmerged event record;

inspect the resource for a cybersecurity object;

detect an event in another unmerged event record; and initiate a remediation action based on a toxic combination, in response to detecting the cybersecurity object and the event.

15. The system of claim 11, wherein the memory contains further instructions which when executed by the processing circuitry further configure the system to:

detect aggregable events based on a common value of a data of runtime data.

16. The system of claim 11, wherein the memory contains further instructions which when executed by the processing circuitry further configure the system to:

generate the aggregated event record based on a plurality of events, each event corresponding to a type of runtime process.

17. The system of claim 11, wherein the memory contains further instructions which when executed by the processing circuitry further configure the system to:

configure the runtime sensor to periodically send an aggregated event record generated within a first time period.

18. The system of claim 11, wherein the memory contains further instructions which when executed by the processing circuitry further configure the system to:

generate an analysis report based on applying a predefined query on a database storing thereon the unmerged event records.

19. The system of claim 11, wherein the memory contains further instructions which when executed by the processing circuitry further configure the system to:

initiate a mitigation action in response to detecting a first event in the unmerged event records from a first resource and a second event in the unmerged event records from a second resource.

* * * * *